US009542617B2

(12) United States Patent
Senzaki et al.

(10) Patent No.: US 9,542,617 B2
(45) Date of Patent: Jan. 10, 2017

(54) IMAGE PROCESSING DEVICE AND IMAGE PROCESSING METHOD FOR CORRECTING A PIXEL USING A CORRECTED PIXEL STATISTICAL VALUE

(71) Applicant: NEC Corporation, Minato-ku, Tokyo (JP)

(72) Inventors: Kenta Senzaki, Tokyo (JP); Masato Tsukada, Tokyo (JP); Hiroaki Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/762,889

(22) PCT Filed: Feb. 26, 2014

(86) PCT No.: PCT/JP2014/054704
§ 371 (c)(1),
(2) Date: Jul. 23, 2015

(87) PCT Pub. No.: WO2014/133010
PCT Pub. Date: Sep. 4, 2014

(65) Prior Publication Data
US 2015/0363666 A1    Dec. 17, 2015

(30) Foreign Application Priority Data

Feb. 28, 2013 (JP) ................................. 2013-038236

(51) Int. Cl.
*G06K 9/40* (2006.01)
*G06K 9/52* (2006.01)
(Continued)

(52) U.S. Cl.
CPC . *G06K 9/52* (2013.01); *G06K 9/46* (2013.01); *G06K 9/4604* (2013.01);
(Continued)

(58) Field of Classification Search
None
See application file for complete search history.

(56) References Cited

U.S. PATENT DOCUMENTS 8,059,910 B2 * 11/2011 Ishiga ..................... G06T 5/10
382/260
8,351,735 B2 * 1/2013 Biezen ................ H04N 1/4072
382/260

(Continued)

FOREIGN PATENT DOCUMENTS

JP    H10-075395 A    3/1998
JP    2002-057900 A   2/2002
(Continued)

OTHER PUBLICATIONS

International Search Report for PCT Application No. PCT/JP2014/054704, mailed on Apr. 22, 2014.
(Continued)

*Primary Examiner* — Randolph I Chu

(57) ABSTRACT

The present invention is directed to an image processing method, comprising: deriving a pixel statistical value of pixels and edge information for each of regions in a plurality of layers, the regions including attention pixels and having ranges that are successively narrower; correcting differential information between a pixel statistical value for a region in an attention layer and a pixel statistical value for a region in a layer wider than the region in the attention layer by using the edge information; correcting the pixel statistical value for the region in the attention layer by using the corrected differential information and the pixel statistical value for the region wider than the region in the attention layer; re-correcting the corrected pixel statistical value for the region in the attention layer by using a pixel statistical value for a region equal to or wider than a region in each of the layers and differential information between the uncorrected pixel (Continued)

statistical value for the region in the attention layer and the corrected pixel statistical value for the region in the attention layer; and correcting the attention pixel by repeating the correcting and the re-correcting the pixel statistical value for the region in the attention layer sequentially in the respective layers until the region is reduced from a maximum range to a minimum range.

11 Claims, 6 Drawing Sheets

(51) Int. Cl.
*H04N 1/409* (2006.01)
*H04N 5/14* (2006.01)
*G06T 5/00* (2006.01)
*G06K 9/46* (2006.01)

(52) U.S. Cl.
CPC .............. *G06K 9/4661* (2013.01); *G06T 5/00* (2013.01); *G06T 5/002* (2013.01); *H04N 1/409* (2013.01); *H04N 5/14* (2013.01); *G06K 2009/4666* (2013.01); *G06T 2207/20016* (2013.01); *G06T 2207/20192* (2013.01)

(56) References Cited

U.S. PATENT DOCUMENTS

| | | | | |
|---|---|---|---|---|
| 9,135,685 B2 * | 9/2015 | Senzaki | .................. | G06T 5/002 |
| 2014/0205202 A1 * | 7/2014 | Toda | ...................... | H04N 1/409 |
| | | | | 382/275 |
| 2015/0086129 A1 * | 3/2015 | Senzaki | .................. | G06T 5/002 |
| | | | | 382/266 |
| 2015/0086130 A1 * | 3/2015 | Senzaki | .................. | G06T 5/002 |
| | | | | 382/266 |
| 2015/0098656 A1 * | 4/2015 | Senzaki | .................. | G06T 5/002 |
| | | | | 382/194 |

FOREIGN PATENT DOCUMENTS

| | | |
|---|---|---|
| JP | 2003-018403 A | 1/2003 |
| WO | 2006/106919 A1 | 10/2006 |
| WO | 2007/114363 A1 | 10/2007 |

OTHER PUBLICATIONS

English translation of Written opinion for PCT Application No. PCT/JP2014/054704.

* cited by examiner

IMAGE PROCESSING DEVICE AND IMAGE PROCESSING METHOD FOR CORRECTING A PIXEL USING A CORRECTED PIXEL STATISTICAL VALUE

This application is a National Stage Entry of PCT/JP2014/054704 filed on Feb. 26, 2014, which claims priority from Japanese Patent Application 2013-038236 filed on Feb. 28, 2013, the contents of all of which are incorporated herein by reference, in their entirety.

TECHNICAL FIELD

The present invention relates to an image processing method and an image processing device.

BACKGROUND ART

Among image processing technologies, a technology of reducing random noise contained in an image is indispensable for reproducing the captured image more clearly. One technology of reducing such random noise is disclosed in, for example, PTL 1.

The technology described in PTL 1 is configured by using: a plurality of arithmetic circuits calculating the number of pixels 'n' for moving average based on a preset mathematical equation with respect to an arbitrary attention pixel 'i' in a main scanning direction in a color digital signal outputted from an input image processing circuit; a plurality of bit selection circuits selectively outputting the attention pixel 'i' and 'n' reference pixels 'j' preceding and following the attention pixel 'i'; a plurality of differential circuits calculating absolute values of differences between an output level of the attention pixel 'i' and respective output levels of the reference pixels 'j'; a plurality of judgment circuits outputting the attention pixel 'i' as well as comparing values outputted from the plurality of differential circuits with a preset threshold value stored in a threshold storage memory to output reference pixels 'j' based on the comparison result; and a plurality of arithmetic circuits performing moving average processing on output signals outputted from the plurality of judgment circuits.

In other words, with a configuration to add a reference pixel 'j' to the moving average processing only when the absolute value of a difference between output levels of the attention pixel 'i' and a reference pixel 'j' is equal to or less than the threshold value, any portion where the absolute value of the difference exceeds the threshold value representing an abrupt change is excluded from the moving average processing, and thus a noise component can be removed effectively.

CITATION LIST

Patent Literature

[PTL 1] Japanese Unexamined Patent Application Publication No. 2002-57900

SUMMARY OF INVENTION

Technical Problem

However, the technology disclosed in PTL 1 fails to remove low-frequency noise with periodicity equal to or greater than the size of a smoothing filter.

In particular, the technology fails in effective removal of noise in a low-brightness region in an image while maintaining edge and texture components in the image.

Accordingly, the present invention has been invented in view of the above-described problem, with an aim to provide an image processing method and an image processing device that are capable of effectively removing noise in a low-brightness region in an image while maintaining edge and texture components in the image.

Solution to Problem

The present invention is directed to an image processing method, including: deriving a pixel statistical value of pixels and edge information for each of regions in a plurality of layers, the regions including attention pixels and having ranges that are successively narrower; correcting differential information between a pixel statistical value for a region in an attention layer and a pixel statistical value for a region in a layer wider than the region in the attention layer by using the edge information; correcting the pixel statistical value for the region in the attention layer by using the corrected differential information and the pixel statistical value for the region wider than the region in the attention layer; re-correcting the corrected pixel statistical value for the region in the attention layer by using a pixel statistical value for a region equal to or wider than a region in each of the layers and differential information between the uncorrected pixel statistical value for the region in the attention layer and the corrected pixel statistical value for the region in the attention layer; and correcting the attention pixel by repeating the correcting and the re-correcting of the pixel statistical value for the region in the attention layer sequentially in the respective layers until the region is reduced from a maximum range to a minimum range.

The present invention is directed to an image processing device, comprising: pixel statistical value calculation means for, for each of regions in a plurality of layers, calculating a pixel statistical value of pixels for the region, the regions including attention pixels and having ranges that are successively narrower; edge information calculation means for calculating edge information for each of the regions in the plurality of layers, the regions including the attention pixels and having the ranges that are successively narrower; correction means for correcting differential information between a pixel statistical value for a region in an attention layer and a pixel statistical value for a region in a layer wider than the region in the attention layer by using the edge information; and correcting the pixel statistical value for the region in the attention layer by using the corrected differential information and the pixel statistical value for the region wider than the region in the attention layer; re-correction means for re-correcting differential information between the uncorrected pixel statistical value for the region in the attention layer and the corrected pixel statistical value for the region in the attention layer by using a pixel statistical value for a region equal to or wider than a region in each of layers and differential information between the uncorrected pixel statistical value for the region in the attention layer and the corrected pixel statistical value for the region in the attention layer, wherein correction and re-correction of the pixel statistical value for the region in the attention layer are repeated sequentially in the respective layers until the region is reduced from a maximum range to a minimum range.

Advantageous Effects of Invention

According to the present invention, noise in a low-brightness region in an image can be effectively removed.

DESCRIPTION OF EMBODIMENTS

Exemplary embodiments of the present invention will now be described.

Figure 1:
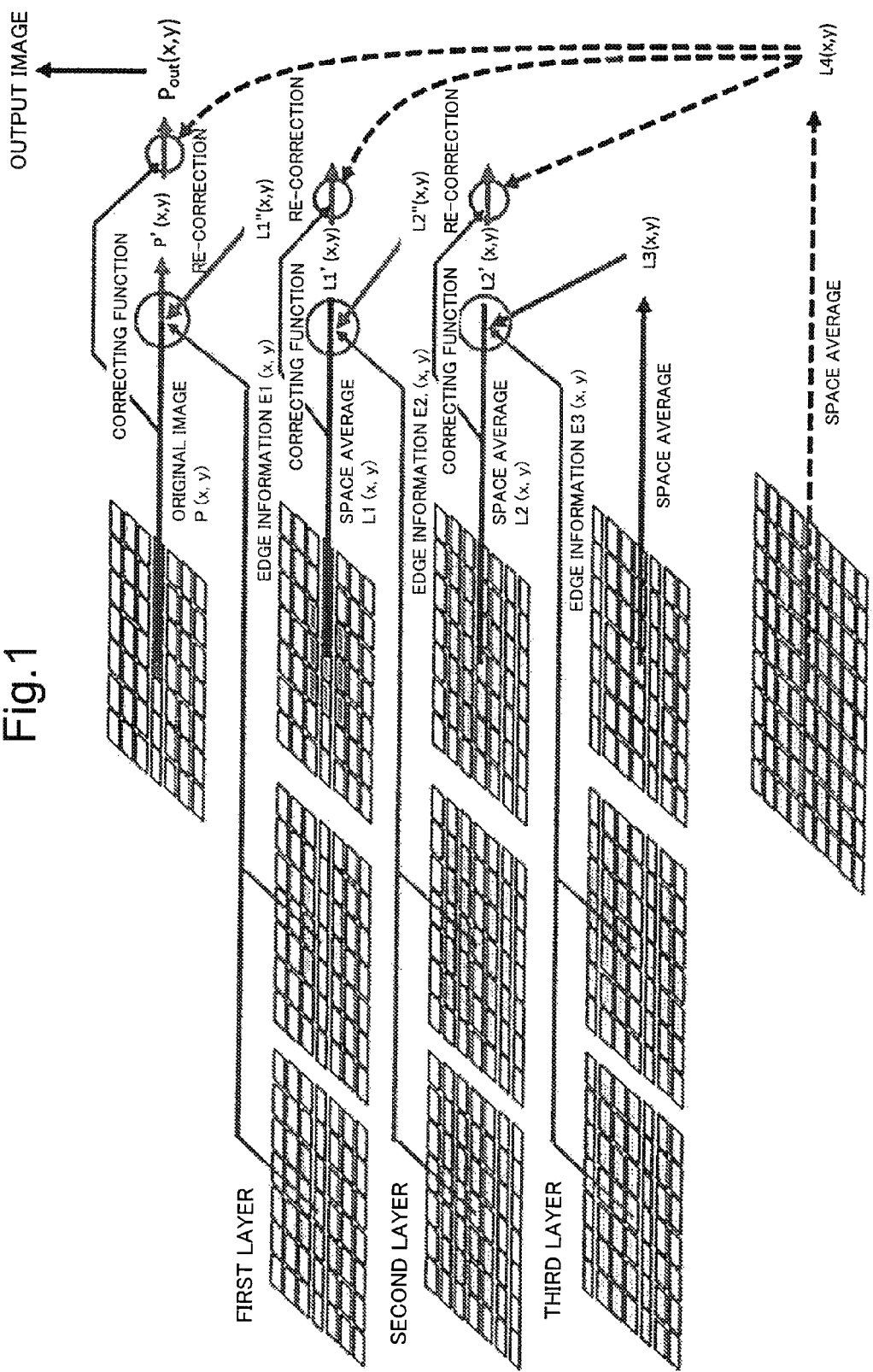
FIG. 1 is an explanatory diagram illustrating an image processing method, which is an exemplary embodiment of the present invention.

FIG. 1 is an explanatory diagram illustrating an image processing method, which is an exemplary embodiment of the present invention. It should be noted that although FIG. 1 illustrates a flow of three-layer multi-resolution processing, the present invention may be applied to two layers or extended to four or more layers with ease.

FIG. 1 is an explanatory diagram illustrating an image processing method, which is an exemplary embodiment of the present invention.

The exemplary embodiment of the present invention is characterized by including: correcting a spatial average value (L2 (x, y)) for a medium region by using a spatial average value L3 (x, y), which is a pixel statistical value of a space in a wide region where the pixel (x, y) (attention pixel) is centered, and edge information or an edge amount E3 (x, y) in the region; in addition, re-correcting L2 (x, y) by extracting a signal from a differential value R2 (x, y) between L2 (x, y) and the corrected spatial average value (L2' (x, y) for the medium region based on a spatial average value L4 (x, y), which is a pixel statistical value for a space equal to or wider than the wide region, and by combining the extracted signal with L2' (x, y); and, correcting a spatial average value (L1 (x, y)) for a narrow region by using the re-corrected spatial average value (L2" (x, y)) for the medium region and an edge amount (E2 (x, y)) in the medium region; deriving an output pixel value $P_{out}$ (x, y) by sequential processing of these corrections corrects an input pixel value $P_{in}$ (x, y).

The term pixel statistical value as used herein refers to a spatial average value in a target region, and the spatial average value refers to an arithmetic mean value, a geometric mean value, a weighted mean value, or the like of pixels present in the region. The following describes a case where the pixel statistical value is a spatial average value, which is an arithmetic mean value of pixels present in a region. It is assumed that the edge amount or edge information is defined by a differential value of statistics (such as mean or median values) of pixels among the left, right, above, and below regions around the attention pixel (input pixel). The following describes a case where the edge amount is a differential value between spatial average values, similar to the pixel statistical value.

The following describes a specific process; however, process flows in the respective layers in FIG. 1 are identical to one another except for parameters for determining a correction amount. Now, by way of example, a detailed description is given below about correcting a spatial average value L2 (x, y) for the medium region by using a spatial average value L3 (x, y) for the wide region and an edge amount E3 (x, y) in the wide region.

First, for the pixel position (x, y), the spatial average value L3 (x, y) for a wide region (range: −k3 to k3) and the spatial average value L2 (x, y) for a medium region (range: −k2 to k2) are calculated as given by the equations (1) and (2), respectively. Note that in the example the ranges of the wide and medium regions are designated by k3 and k2, respectively, having the same number of pixels in both horizontal and vertical direction, but the number of pixels is not necessarily the same in the horizontal and vertical directions.

$$L3(x, y) = \frac{1}{(2 \cdot k3 + 1)^2} \sum_{i=-k3}^{k3} \sum_{j=-k3}^{k3} P_{in}(x+i, y+j) \quad (1)$$

$$L2(x, y) = \frac{1}{(2 \cdot k2 + 1)^2} \sum_{i=-k2}^{k2} \sum_{j=-k2}^{k2} P_{in}(x+i, y+j) \quad (2)$$

Next, the edge amount E3 (x, y) in the wide region is calculated. The edge amount E3 (x, y) in the wide region is calculated by calculating an edge amount EV3 (x, y) in the vertical direction and an edge amount EH3 (x, y) in the horizontal direction as given by the equations (3) and (4), respectively, followed by adding the results as given by the equation (5). Note that in the example the range of the wide region is designated by k3 having the same number of pixels in both horizontal and vertical directions, but the number of pixels is not necessarily the same in the horizontal and vertical directions. Note that the above description mentions edge amounts in horizontal and vertical directions, but an edge amount in an oblique direction may be calculated and used.

$$EV3(x, y) = \quad (3)$$
$$\frac{1}{(2 \cdot k3 + 1) \cdot k3} \left| \sum_{i=-k3}^{k3} \sum_{j=1}^{k3} (P_{in}(x+i, y+j) - P_{in}(x+i, y-j)) \right|$$

$$EH3(x, y) = \quad (4)$$
$$\frac{1}{(2 \cdot k3 + 1) \cdot k3} \left| \sum_{i=1}^{k3} \sum_{j=-k3}^{k3} (P_{in}(x+i, y+j) - P_{in}(x-i, y+j)) \right|$$

$$E3(x, y) = EV3(x, y) + EH3(x, y) \quad (5)$$

Then, the spatial average value L3 (x, y) for the wide region is corrected by using a composite weight α3 (x, y), which is calculated based on the calculated edge amount E3 (x, y), to produce a corrected spatial average value L3' (x, y) for the wide region as given by the equation (6). The composite weight α3 (x, y) is calculated by using predefined threshold values hi3 and lo3 as given by the equation (7).

$$L3'(x, y) = (1 - \alpha 3(x, y)) \cdot L3(x, y) + \alpha 3(x, y) \cdot L2(x, y) \quad (6)$$

$$\alpha 3(x, y) = \begin{cases} 1.0 & \text{if } E3(x, y) > hi3 \\ 0.0 & \text{else if } E3(x, y) < lo3 \\ \dfrac{E3(x, y) - lo3}{hi3 - lo3} & \text{else} \end{cases} \quad (7)$$

Note that hi3 is a threshold value for considering the medium region to be an edge and lo3 is a threshold value for considering the medium region to be flat, where hi3>lo3.

The spatial average value L2(x, y) for the medium region is corrected by using the spatial average value L3' calculated as above, according to the equation (8).

$$L2'(x,y)=L3'(x,y)+\text{Func}(L2(x,y)-L3'(x,y)) \quad (8)$$

Figure 2:
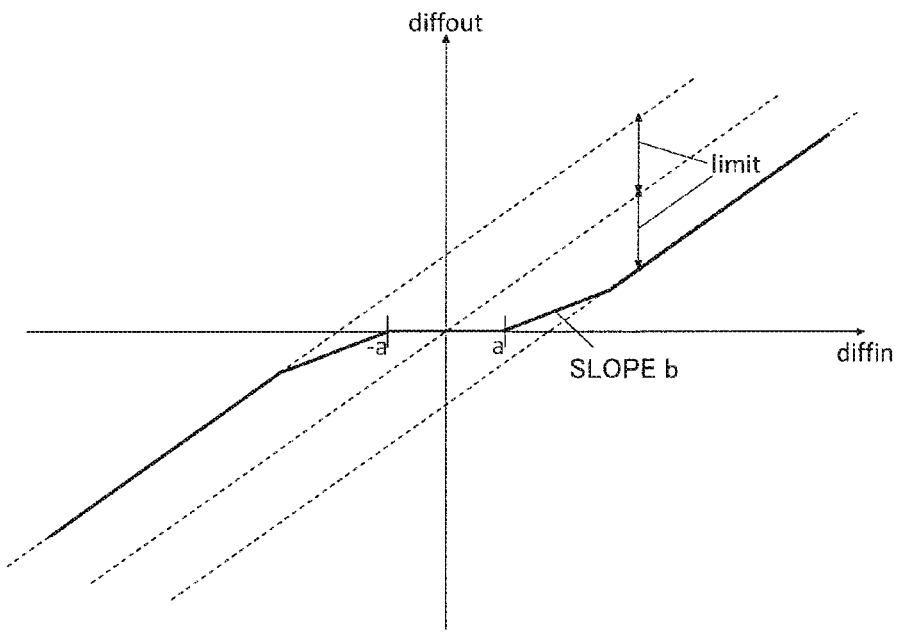
FIG. 2 is a diagram illustrating an example of the Func function.

An example of the correction function Func as shown in FIG. 2 is used here. For example, correcting the spatial average value L2 (x, y) for the medium region with respect to the pixel position (x, y) is performed by adding a correction amount diffout, which is given by the correction function in FIG. 2, to L2 (x, y), assuming that diffin is (L2 (x, y)–L3'(x, y)). Parameters 'a', 'b', and 'limit' in the correction function in FIG. 2 are determined separately for every resolution to be processed and every color component to be corrected.

There is another possible configuration where noise components are adaptively suppressed in each of the layers by reflecting the edge amount E3 (x, y) calculated according to the equation (5) in the Func function (correction function) in each of the layers for suppressing noise components so as to change the Func function (correction function) in each of the layers.

A coefficient β3 (x, y), which varies with an edge amount E3 (x, y), is now defined as shown in the equation (9). Threshold values hi3 and lo3 for E3 (x, y) are preset values and, similarly to the equation (7), hi3 is a threshold value for considering the medium region to be an edge and lo3 is a threshold value for considering the medium region to be flat, where hi3>lo3.

$$\beta 3(x, y) = \begin{cases} 0.0 & \text{if } E3(x, y) > hi3 \\ 1.0 & \text{else if } E3(x, y) < lo3 \\ \dfrac{E3(x, y) - lo3}{hi3 - lo3} & \text{else} \end{cases} \quad (9)$$

Figure 3:
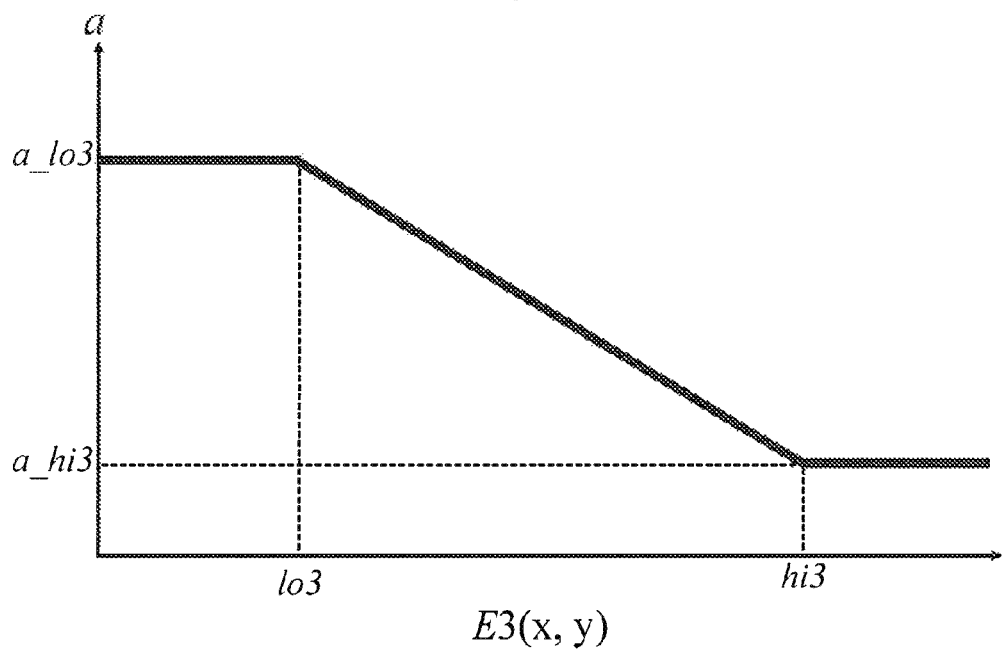
FIG. 3 is a diagram illustrating an example setting of the parameter 'a' for a wide region.

The coefficient β3 (x, y) as defined by the equation (9) is a real number ranging from 0.0 to 1.0. The parameter 'a' for the Func function is defined as in the equation (10) below by using the coefficient β3 (x, y). A relationship between the edge amount E3 (x, y) and the parameter 'a' is shown in FIG. 3.

$$a=\beta 3(x,y)\times a\_lo3+(1-\beta 3(x,y))\times a\_hi3 \quad (10)$$

In the equation, a_lo3 represents a value of the parameter 'a' used for an edge amount E3 (x, y) smaller than the threshold value lo3, while a_hi3 represents a value of the parameter 'a' used for an edge amount greater than the threshold value hi3. For an edge amount E3 (x, y) between the threshold values lo3 and hi3, the parameter 'a' ranges from a_hi3 to a_lo3, where a_hi3 is a real number greater than 0 and a_lo3 is a real number satisfying a_lo3>=a_hi3.

With the resulting Func function as derived above, the spatial average value L2 (x, y) in the medium region is corrected as given by the equation (11).

$$L2'(x,y)=L3(x,y)+\text{Func}(L2(x,y)-L3(x,y)) \quad (11)$$

In this way, a corrected spatial average value L2' (x, y) in the medium region is derived by using the equations (1) through (8), or the equations (1) through (5) and the equations (9) through (11).

Next, a differential value R2 (x, y) between the spatial average value in the medium region L2 (x, y) and the corrected spatial average value in the medium region (L2' (x, y)) is determined as given by the equation (12). In other words, R2 (x, y) represents an amount of correction for L2 (x, y). Furthermore, as shown in the equation (13), a re-corrected spatial average value for the medium region L2"(x, y) is derived by extracting a signal from R2 (x, y) with the function $F_{resid}$ that is based on a spatial average value L4 (x, y), which is a pixel statistical value for a space equal to or wider than the wide region, and by combining the extracted signal with L2' (x, y).

$$R2(x,y)=L2(x,y)-L2'(x,y) \quad (12)$$

$$L2''(x,y)=L2'(x,y)+F_{resid}(R2(x,y),L^4(x,y),\alpha 1,\alpha 2,l_{hi},l_{lo}) \quad (13)$$

The following equation (14) is an example (arithmetic mean value) of the spatial average value L4 (x, y) shown in the equation (13), which is a pixel statistical value for a space equal to or wider than the wide region. Note that in the example the range of the space equal to or wider than the wide region is designated by k4 having the same number of pixels in both horizontal and vertical directions, but the number of pixels is not necessarily the same in the horizontal and vertical directions, $$L4(x, y) = \frac{1}{(2 \cdot k4 + 1)^2} \sum_{i=-k4}^{k4} \sum_{j=-k4}^{k4} P_{in}(x + i, y + j) \quad (14)$$

where k4>=k3.

Figure 4:
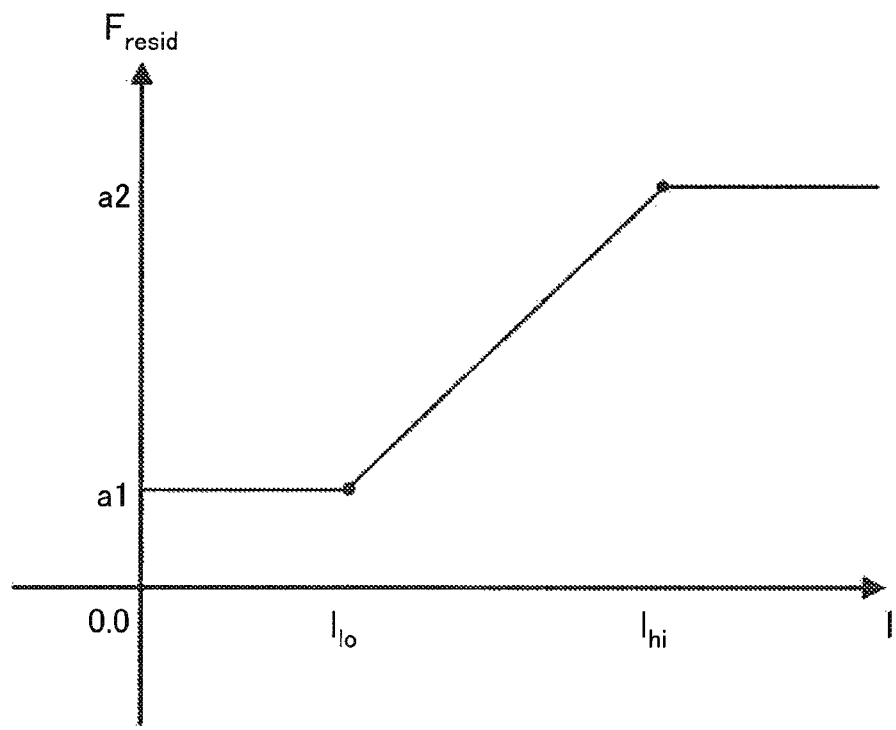
FIG. 4 is an explanatory diagram illustrating an example shape of a re-correction function according to the present exemplary embodiment.

The following equation (15) represents an example of the function $F_{resid}$ shown in the equation (13):

$$F_{resid}(r, l, \alpha 1, \alpha 2, l_{hi}, l_{lo}) = \begin{cases} \alpha 2 \times r & \text{if } l > l_{hi} \\ \alpha 1 \times r & \text{else if } l < l_{lo} \\ \left((\alpha 2 - \alpha 1) \times \dfrac{l - l_{lo}}{l_{hi} - l_{lo}} + \alpha 1\right) \times r & \text{else} \end{cases} \quad (15)$$

where α1<=α2, and basically 0.0<=α1<=α2<=1.0. That is, when the attention pixel is included in a high-brightness region (L4 (x, y)>$l_{hi}$), the equation (15) sets a final amount of correction small to avoid loss of a sense of resolution by extracting a value at a high percentage from the differential value R2 (x, y). When the attention pixel is included in a dark region (L4 (x, y)<$l_{lo}$), the equation (15) keeps a final amount of correction large to maintain the noise removal performance in a dark region by extracting a value at a low percentage from the differential value R2 (x, y). In addition, when the attention pixel is included in a region that is neither the high-brightness region nor the dark region, the equation (15) keeps a balance between the sense of resolution and noise removal by extracting a value that is proportional to the brightness of the target region from the differential value R2 (x, y). FIG. 4 shows a relationship between the surrounding average brightness 'l' and the output of the function Fresid in the equation (15), where 'r', an input to the function Fresid, is 1.

Note that the threshold values $l_{hi}$, $l_{lo}$ and the parameters $\alpha1$, $\alpha2$ in the equation (13) may or may not be changed among layers.

The function $F_{resid}$ is not limited to the equation (15) and may be otherwise configured like the following equation (16) or (17):

$$F_{resid}(r, l, \alpha1, \alpha2, l_{hi}, l_{lo}) = \begin{cases} \alpha2 \times r & \text{if } l > l_{hi} \\ \alpha1 \times \dfrac{l}{l_{lo}} \times r & \text{else if } l < l_{lo} \\ \left((\alpha2 - \alpha1) \times \dfrac{l - l_{lo}}{l_{hi} - l_{lo}} + \alpha1\right) \times r & \text{else} \end{cases} \quad (16)$$

$$F_{resid}(r, l, \alpha2, l_{hi}) = \begin{cases} \alpha2 \times r & \text{if } l > l_{hi} \\ \alpha2 \times \dfrac{l}{l_{hi}} \times r & \text{otherwise} \end{cases} \quad (17)$$

Figure 5:
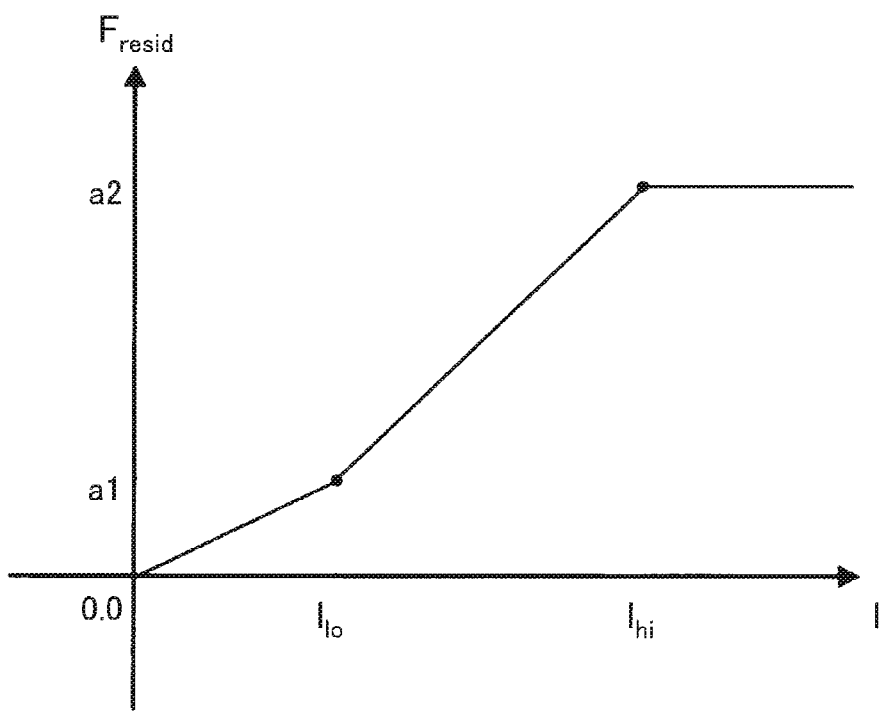
FIG. 5 is an explanatory diagram illustrating an example shape of a re-correction function according to the present exemplary embodiment.
Figure 6:
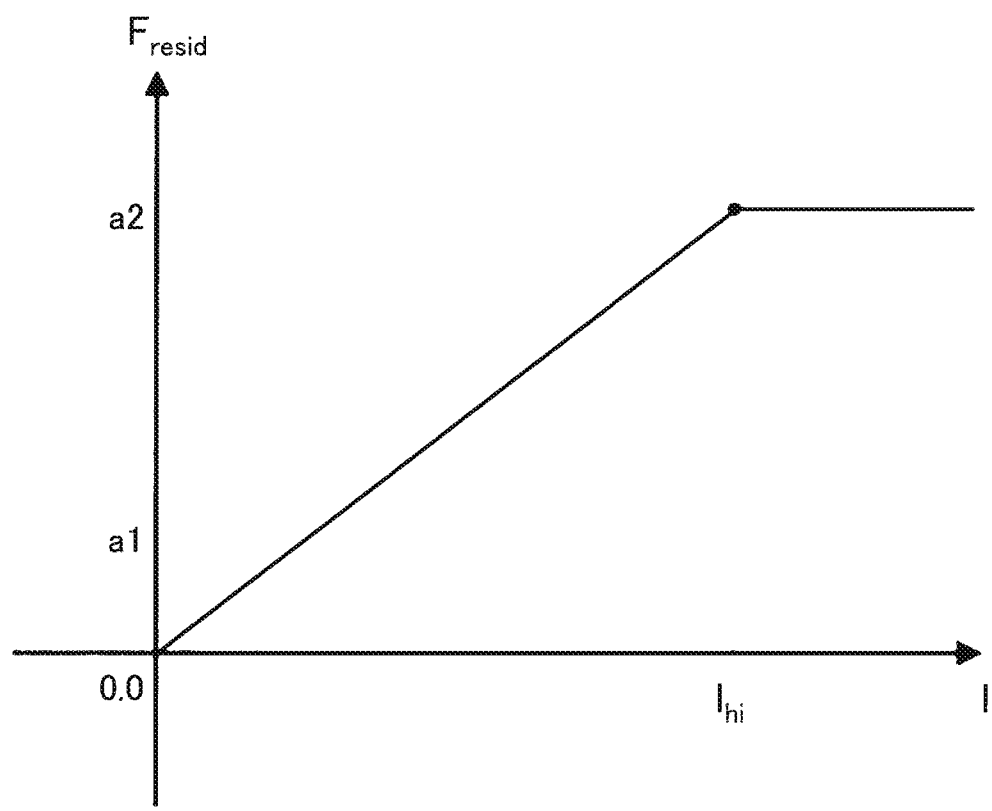
FIG. 6 is an explanatory diagram illustrating an example shape of a re-correction function according to the present exemplary embodiment.

FIGS. 5 and 6 each show a relationship between the surrounding average brightness 'l' and the output of the function $F_{resid}$, where 'r', an input to the function $F_{resid}$ in the equations (16) and (17), is 1.

Furthermore, a similar effect can also be obtained by replacing the equation (13) with the following equation (18):

$$L2''(x,y) = L2'(x,y) + F_{resid}(R2(x,y), \lambda') \quad (18)$$

where the function Fresid is given by the equation (19) or (20). The sign function in the equation (19) is a function for outputting the sign of an input, and $\lambda'$ in the equation (19) or (20) is given by the equation (21).

$$F_{resid}(r, \lambda') = \begin{cases} \text{sign}(r) \times (|r| - \lambda', 0) & \text{if } |r| > \lambda' \\ 0 & \text{otherwise} \end{cases} \quad (19)$$

$$F_{resid}(r, \lambda') = \begin{cases} r & \text{if } |r| > \lambda' \\ 0 & \text{otherwise} \end{cases} \quad (20)$$

$$\lambda' = \begin{cases} \alpha2 \times \lambda & \text{if } l > l_{hi} \\ \alpha1 \times \lambda & \text{else if } l < l_{lo} \\ \left((\alpha2 - \alpha1) \times \dfrac{l - l_{lo}}{l_{hi} - l_{lo}} + \alpha1\right) \times \lambda & \text{else} \end{cases} \quad (21)$$

where $\alpha1 > \alpha2$, and basically $\alpha1 > \alpha2 >= 0.0$. A higher value of $\lambda$ represents higher performance of noise removal. That is, when the attention pixel is included in a high-brightness region (L4 (x, y)>$l_{hi}$), the equation (21) is able to set a final amount of correction small to avoid loss of a sense of resolution by giving a lower value to $\lambda$. When the attention pixel is included in a dark region (L4 (x, y)<$l_{lo}$), the equation (21) keeps a final amount of correction large to maintain the noise removal performance in a dark region by giving a higher value to $\lambda$. In addition, when the attention pixel is included in a region that is neither the high-brightness region nor the dark region, the equation (21) keeps a balance between the sense of resolution and noise removal by adjusting a value of $\lambda$ in proportion to the brightness of the target region.

Similarly to those shown in the equations (15), (16), and (17), $\lambda$, the threshold values $l_{hi}$, $l_{lo}$, and the parameters $\alpha1$, $\alpha2$ may be changed and may not be changed among layers.

Similarly, $\lambda'$ is not limited to the equation (21) and may be replaced like the equation (15), which may be replaced with the equation (16) or (17).

As described above, in the first exemplary embodiment, an amount of re-correction for noise suppression is controlled by using a spatial average value, which is a pixel statistical value for a space equal to or wider than the wide region. The image processing method described in the exemplary embodiment can be used to effectively remove noise in a low-brightness region in an image where noise is relatively conspicuous, while maintaining edge and texture components in the image.

An image processing device according to an exemplary embodiment of the present invention will now be described.

Figure 7:
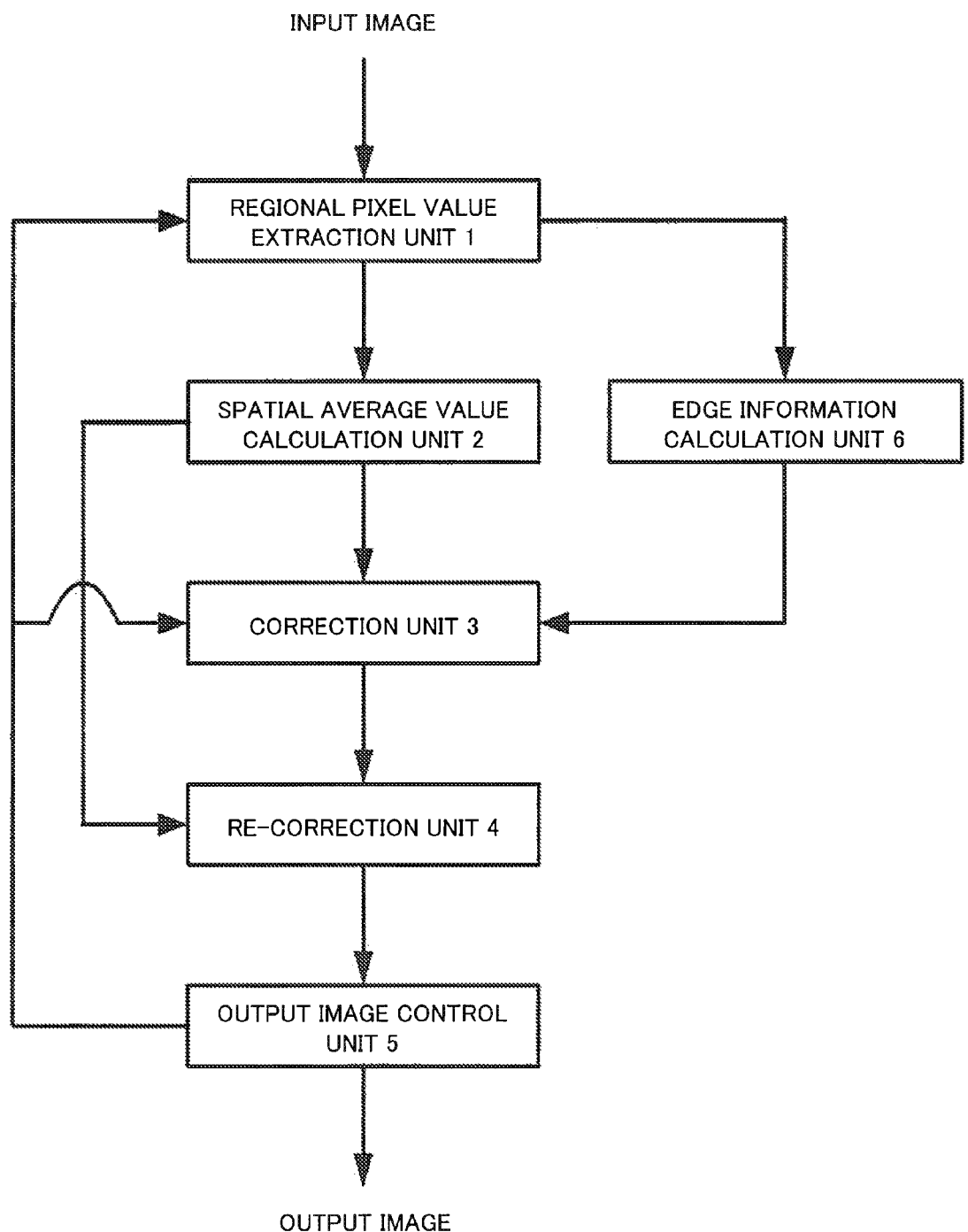
FIG. 7 is a block diagram illustrating an image processing device according to the present exemplary embodiment.

FIG. 7 is a block diagram illustrating an image processing device according to the exemplary embodiment of the present invention.

In the first exemplary embodiment, a corrected value is obtained in one of two ways: one with the equations (1) through (8); and the other with the equations (1) through (5) and the equations (9) through (11).

FIG. 7 illustrates an image processing device that provides a corrected value by using the equations (1) through (8).

The image processing device shown in FIG. 7 according to the present exemplary embodiment includes a regional pixel value extraction unit 1, a spatial average value calculation unit 2, a correction unit 3, a re-correction unit 4, an output image control unit 5, and an edge information calculation unit 6.

The regional pixel value extraction unit 1 extracts pixel values of pixels present in the wide region, pixel values of pixels present in the medium region, pixel values of pixels present in the narrow region, pixel values of pixels present in a region equal to or wider than the wide region, in each of which regions the pixel position (x, y) (attention pixel) is centered, and a pixel value of the input pixel value $P_{in}$ (x, y) (attention pixel) at their respective timings, and then outputs these pixel values to the spatial average value calculation unit 2 and to the edge information calculation unit 6.

The spatial average value calculation unit 2 receives the pixel values in the respective regions from the regional pixel value extraction unit 1 and calculates spatial average values for the respective regions. Then, the calculated spatial average values for the wide, medium, and narrow regions are outputted to the correction unit 3 and to the re-correction unit 4. The spatial average value for the region equal to or wider than the wide region is outputted to the re-correction unit 4 only.

The edge information calculation unit 6 calculates the edge amount E3 (x, y) in the large region based on the pixel values of pixels present in the wide region incoming from the regional pixel value extraction unit 1. The edge amount E3 (x, y) in the wide region is calculated by calculating an edge amount EV3 (x, y) in the vertical direction and an edge amount EH3 (x, y) in the horizontal direction as given by the equations (3) and (4), respectively, followed by adding the results as given by the equation (5). Similarly, an edge amount E2 (x, y) in the medium region and an edge amount E1 (x, y) in the narrow region are calculated. Note that the above description mentions edge amounts in horizontal and vertical directions, but an edge amount in an oblique direction may be calculated and used.

The correction unit 3 corrects the spatial average value L3 (x, y) for the wide region by using a composite weight $\alpha3$ (x, y) that is which is able to be derived from the edge amount E3 (x, y) calculated by the edge information calculation unit 6, to produce through the calculation a corrected spatial average value L3' (x, y) for the wide region, as given by the equation (6). The composite weight α3 (x, y) is calculated by using predefined threshold values hi3 and lo3 as given by the equation (7).

Furthermore, the spatial average value L2 (x, y) for the medium region is corrected by using the calculated spatial average value L3' as given by the equation (8) to derive a corrected spatial average value L2' (x, y). Similar corrections are made to the spatial average value L1 (x, y) and to the input pixel value $P_{in}$ (x, y).

The re-correction unit 4 calculates a differential value between the uncorrected spatial average value L2 (x, y) and the corrected spatial average value L2' (x, y), and then re-corrects L2' (x, y), as given by the equation (18), based on the spatial average value L4 (x, y) for a region equal to or wider than the wide region, as calculated by the spatial average value calculation unit 2, to derive a re-corrected spatial average value L2"(x, y). Similar re-corrections are made to the corrected spatial average value L1' (x, y) and to the corrected input pixel value P y).

The output image control unit 5 gives an instruction to the regional pixel value extraction unit 1 to extract pixel values of pixels in a region in a subsequent layer every time a corrected spatial average value is inputted in sequence. The re-corrected spatial average value is fed back to the correction unit 3 every time the value is inputted. Then, $P_{out}$ (x, y) is outputted as an output pixel value when $P_{out}$(x, y) of a single pixel is inputted.

Figure 8:
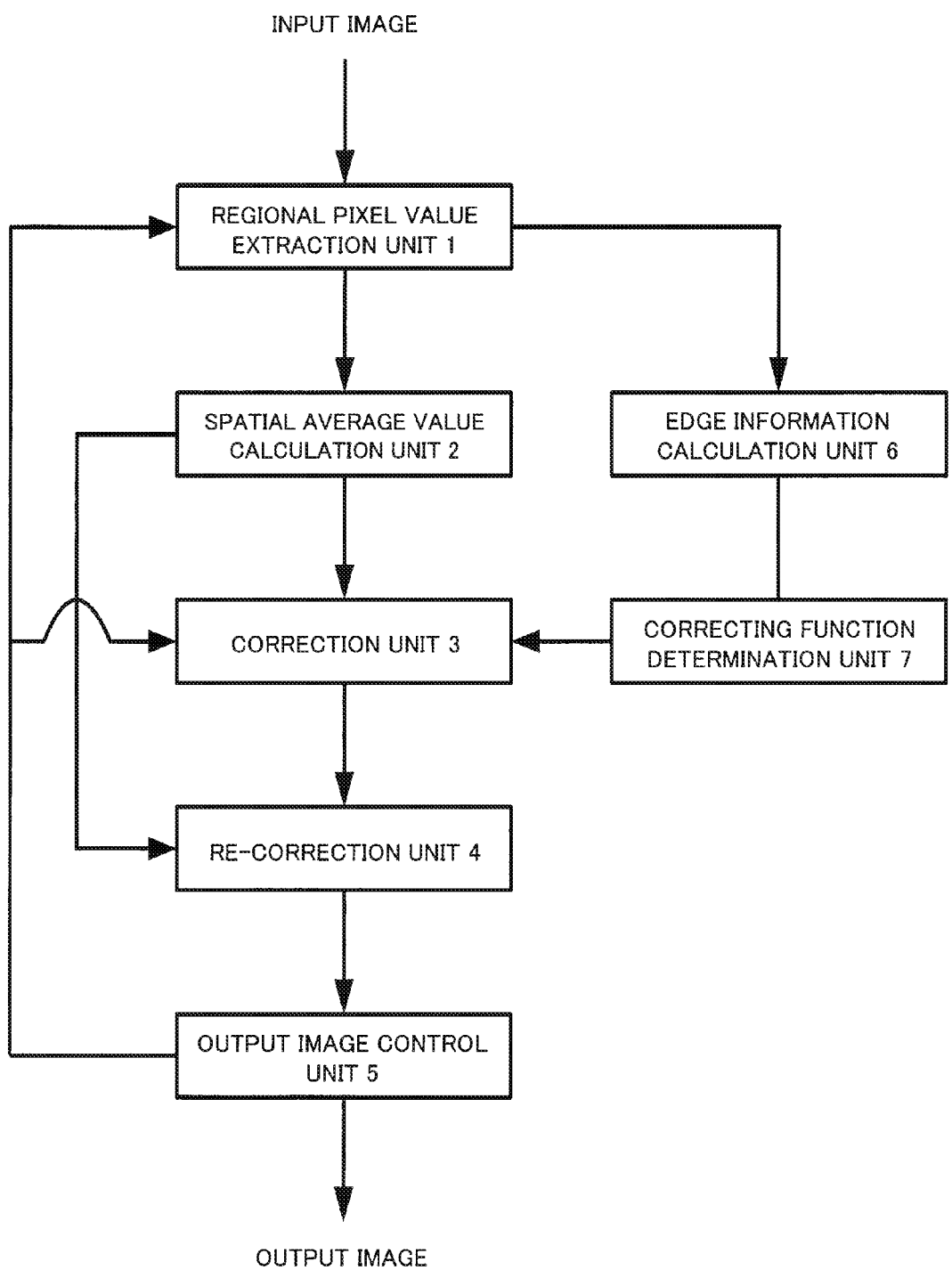
FIG. 8 is a block diagram illustrating an image processing device according to the present exemplary embodiment.

FIG. 8 illustrates an image processing device according to an exemplary embodiment of the present invention where the device provides a corrected value using the equations (1) through (5) and the equations (9) through (11).

The image processing device shown in FIG. 8 according to the exemplary embodiment of the present invention includes the regional pixel value extraction unit 1, the spatial average value calculation unit 2, the correction unit 3, the re-correction unit 4, the output image control unit 5, the edge information calculation unit 6, and a correcting function determination unit 7.

The regional pixel value extraction unit 1, the spatial average value calculation unit 2, the re-correction unit 4, the output image control unit 5, and the edge information calculation unit 6 operate in the same way as in the image processing device shown in FIG. 7 according to the first exemplary embodiment.

The correcting function determination unit 7 calculates the parameter 'a' in the Func function (correcting function) as shown in the equations (9) and (10) based on the edge amount calculated by the edge information calculation unit 6 to determine Func functions (correcting functions) for the respective layers.

The correction unit 3 corrects the spatial average values for the respective layers by using the Func functions (correcting functions) determined by the correcting function determination unit 7 for the respective layers.

As described above, according to exemplary embodiments of the present invention, it is made possible to effectively remove noise in a low-brightness region in an image where noise is relatively conspicuous, while maintaining edge and texture components in the image by controlling an amount of re-correction for noise suppression based on a pixel statistical value for a region equal to or wider than the region on each layer.

Note that the image processing devices described in the above exemplary embodiments and in the claims at least include a camera used for taking still images and video images, imaging equipment used for editing still images or video data, and an image display device used for receiving and displaying still images or video data, and thus all of these devices are applicable.

As is apparent from the above description, while it is possible to configure the individual units with hardware, these units are also able to be implemented by a computer program. In this case, functions and/or operations similar to those in the above-described exemplary embodiments are implemented by a processor caused to operate by a program stored in a program memory. It is also possible to implement only a part of functions of the aforementioned embodiments by a computer program.

The whole or part of the above exemplary embodiments can be described as, but is not limited to, the following supplementary notes.

(Supplementary Note 1)

An image processing method, including:

deriving a pixel statistical value of pixels and edge information for each of regions in a plurality of layers, the regions including attention pixels and having ranges that are successively narrower;

correcting differential information between a pixel statistical value for a region in an attention layer and a pixel statistical value for a region in a layer wider than the region in the attention layer by using the edge information;

correcting the pixel statistical value for the region in the attention layer by using the corrected differential information and the pixel statistical value for the region wider than the region in the attention layer;

re-correcting the corrected pixel statistical value for the region in the attention layer by using a pixel statistical value for a region equal to or wider than a region in each layer and differential information between the uncorrected pixel statistical value for the region in the attention layer and the corrected pixel statistical value for the region in the attention layer; and correcting the attention pixel by repeating the correcting and the re-correcting the pixel statistical value for the region in the attention layer sequentially in the respective layers until the region is reduced from a maximum range to a minimum range.

(Supplementary Note 2)

The image processing method according to Supplementary Note 1, wherein the re-correcting includes:

setting a smaller amount of correction and performing correcting when the attention pixel is included in a high-brightness region;

setting a larger amount of correction and performing correcting when the attention pixel is included in a low-brightness region; and performing correcting with an amount of correction depending on information about average brightness around the attention pixel when the attention pixel is included in a region that is neither the high-brightness region nor the low-brightness region.

(Supplementary Note 3)

The image processing method according to Supplementary Note 1 or 2, including:

calculating the differential information by using a pixel statistical value for a region in an attention layer, a pixel statistical value for a region in a layer wider than the region in the attention layer, and edge information for a region in a layer wider than the region in the attention layer.

(Supplementary Note 4)

The image processing method according to Supplementary Note 3, wherein the pixel statistical value for the attention layer is not corrected if the edge information for the region in the layer wider than the region in the attention layer exceeds a predefined threshold value.

(Supplementary Note 5)

The image processing method according to any one of Supplementary Notes 1 to 4, including:

varying a degree of correction on a layer-by-layer basis when correcting the pixel statistical value for the region in the attention layer by using the corrected differential information and the pixel statistical value for the region wider than the region in the attention layer.

(Supplementary Note 6)

The image processing method according to Supplementary Note 5, including:

varying a degree of correction depending on an amount of change in a pixel value caused by noise in the region in the attention layer when correcting the pixel statistical value for the region in the attention layer by using the corrected differential information and the pixel statistical value for the region wider than the region in the attention layer.

(Supplementary Note 7)

The image processing method according to Supplementary Note 5, including:

varying a degree of correction depending on an edge amount in a region wider than the region in the attention layer when correcting the pixel statistical value for the region in the attention layer by using the corrected differential information and the pixel statistical value for the region wider than the region in the attention layer.

(Supplementary Note 8)

The image processing method according to any one of Supplementary Notes 1 to 7, including:

wherein a correction is made in such a way that, when correcting the pixel statistical value for the region in the attention layer by using the corrected differential information and the pixel statistical value for the region wider than the region in the attention layer, outputting a value closer to zero for the differential information being closer to zero, and performing correcting with a smaller degree of correction for the differential information being greater.

(Supplementary Note 9)

The image processing method according to any one of Supplementary Notes 1 to 8, wherein a spatial average value of pixels is used as the pixel statistical value.

(Supplementary Note 10)

The image processing method according to Supplementary Note 9, wherein the spatial average value is any one of an arithmetic mean value, a geometric mean value, and a weighted average value, of pixels.

(Supplementary Note 11)

An image processing device, comprising:

pixel statistical value calculation means for, for each of regions in a plurality of layers, calculating a pixel statistical value of pixels in a region, the regions containing attention pixels and having ranges that are successively narrower;

edge information calculation means for calculating edge information for each of the regions in the plurality of layers, the regions including the attention pixels and having the ranges that are successively narrower;

correction means for correcting differential information between a pixel statistical value for a region in an attention layer and a pixel statistical value for a region in a layer wider than the region in the attention layer by using the edge information, and correcting the pixel statistical value for the region in the attention layer by using the corrected differential information and the pixel statistical value for the region wider than the region in the attention layer; and re-correction means for re-correcting differential information between the uncorrected pixel statistical value for the region in the attention layer and the corrected pixel statistical value for the region in the attention layer by using a pixel statistical value for a region equal to or wider than a region in each of layers and differential information between the uncorrected pixel statistical value for the region in the attention layer and the corrected pixel statistical value for the region in the attention layer, wherein correction and re-correction of the pixel statistical value for the region in the attention layer are repeated sequentially in the respective layers until the region is reduced from a maximum range to a minimum range.

(Supplementary Note 12)

The image processing device according to Supplementary Note 11, wherein the re-correction means sets a smaller amount of correction and performs correcting when the attention pixel is included in a high-brightness region, sets a larger amount of correction and performs correcting when the attention pixel is included in a low-brightness region, and performs correcting with an amount of correction depending on information about average brightness around the attention pixel when the attention pixel is included in a region that is neither the high-brightness region nor the low-brightness region.

(Supplementary Note 13)

The image processing device according to Supplementary Note 11 or 12, wherein the correction means calculates the differential information by using the pixel statistical value for the region in the attention layer, a pixel statistical value for a region in a layer wider than the region in the attention layer, and edge information for a region in a layer wider than the region in the attention layer.

(Supplementary Note 14)

The image processing device according to Supplementary Note 13, wherein the correction means does not correct the pixel statistical value for the attention layer when the edge information for the region in the layer wider than the region in the attention layer exceeds a predefined threshold value.

(Supplementary Note 15)

The image processing device according to any one of Supplementary Notes 11 to 14, wherein the correction means varies a degree of correction on a layer-by-layer basis when the pixel statistical value for the region in the attention layer is corrected by using the corrected differential information and the pixel statistical value for the region wider than the region in the attention layer.

(Supplementary Note 16) The image processing device according to Supplementary Note 15, wherein the correction means varies a degree of correction depending on an amount of change in a pixel value caused by noise in the region in the attention layer when the pixel statistical value for the region in the attention layer is corrected by using the corrected differential information and the pixel statistical value for the region wider than the region in the attention layer.

(Supplementary Note 17)

The image processing device according to Supplementary Note 15, wherein the correction means varies a degree of correction depending on an edge amount in a region wider than the region in the attention layer when the pixel statistical value for the region in the attention layer is corrected by using the corrected differential information and the pixel statistical value for the region wider than the region in the attention layer.

(Supplementary Note 18)

The image processing device according to any one of Supplementary Notes 11 to 17, wherein when correcting the pixel statistical value for the region in the attention layer by using the corrected differential information and the pixel statistical value for the region wider than the region in the attention layer, the correction means outputs a value closer to zero for the differential information being closer to zero, and performs correcting with a smaller degree of correction for the differential information being greater.

(Supplementary Note 19)

The image processing device according to any one of Supplementary Notes 11 to 18, wherein a spatial average value of pixels is used as the pixel statistical value.

(Supplementary Note 20)

The image processing device according to Supplementary Note 19, wherein the spatial average value is any one of an arithmetic mean value, a geometric mean value, and a weighted average value, of pixels.

(Supplementary Note 21)

A program causing a computer to execute:

a pixel statistical value calculation process of, for each of regions in a plurality of layers, calculating a pixel statistical value of pixels in a region, the regions containing their respective attention pixels and having ranges that are successively narrower;

an edge information calculation process of calculating edge information for each of the regions in the plurality of layers, the regions including attention pixels and having ranges that are successively narrower;

a correction process of correcting differential information between a pixel statistical value for a region in an attention layer and a pixel statistical value for a region in a layer wider than the region in the attention layer by using the edge information; and correcting the pixel statistical value for the region in the attention layer by using the corrected differential information and the pixel statistical value for the region wider than the region in the attention layer, and a re-correction process of re-correcting differential information between the uncorrected pixel statistical value for the region in the attention layer and the corrected pixel statistical value for the region in the attention layer by using a pixel statistical value for a region equal to or wider than a region in each of layers and differential information between the uncorrected pixel statistical value for the region in the attention layer and the corrected pixel statistical value for the region in the attention layer, wherein the processes of correcting and re-correcting the pixel statistical value for the region in the attention layer are repeated sequentially in the respective layers until the region is reduced from a maximum range to a minimum range.

(Supplementary Note 22)

The program according to Supplementary Note 21, wherein the re-correction process includes:

setting a smaller amount of correction and performing correcting when the attention pixel is included in a high-brightness region;

setting a larger amount of correction and performing correcting when the attention pixel is included in a low-brightness region; and performing correcting with an amount of correction depending on information about average brightness around the attention pixel when the attention pixel is included in a region that is neither the high-brightness region nor the low-brightness region.

(Supplementary Note 23)

The program according to Supplementary Note 21 or 22, wherein the correction process calculates the differential information by using the pixel statistical value for the region in the attention layer, a pixel statistical value for a region in a layer wider than the region in the attention layer, and edge information for a region in a layer wider than the region in the attention layer.

(Supplementary Note 24)

The program according to Supplementary Note 23, wherein the correction process does not correct the pixel statistical value for the attention layer when the edge information for the region in the layer wider than the region in the attention layer exceeds a predefined threshold value.

(Supplementary Note 25)

The program according to any one of Supplementary Notes 21 to 24, wherein the correction process varies a degree of correction on a layer-by-layer basis when correcting the pixel statistical value for the region in the attention layer by using the corrected differential information and the pixel statistical value for the region wider than the region in the attention layer.

(Supplementary Note 26)

The program according to Supplementary Note 25, wherein the correction process varies a degree of correction depending on an amount of change in a pixel value caused by noise in the region in the attention layer when correcting the pixel statistical value for the region in the attention layer by using the corrected differential information and the pixel statistical value for the region wider than the region in the attention layer.

(Supplementary Note 27)

The program according to Supplementary Note 25, wherein the correction process varies a degree of correction depending on an edge amount in a region wider than the region in the attention layer when correcting the pixel statistical value for the region in the attention layer by using the corrected differential information and the pixel statistical value for the region wider than the region in the attention layer.

(Supplementary Note 28)

The program according to any one of Supplementary Notes 21 to 27, wherein the correction process makes a correction in such a way that, when correcting the pixel statistical value for the region in the attention layer by using the corrected differential information and the pixel statistical value for the region wider than the region in the attention layer, the correction process outputs a value closer to zero for the differential information being closer to zero, and performs correcting with a smaller degree of correction for the differential information being greater.

(Supplementary Note 29)

The program according to any one of Supplementary Notes 21 to 28, wherein a spatial average value of pixels is used as the pixel statistical value.

(Supplementary Note 30)

The program according to Supplementary Note 29, wherein the spatial average value is any one of an arithmetic mean value, a geometric mean value, and a weighted average value, of pixels.

(Supplementary Note 31)

A recording medium storing the program according to any one of Supplementary Notes 21 to 30.

While the present invention has been described with reference to exemplary embodiments, the invention is not necessarily limited to the embodiments described above, and may be carried out with various modifications within the scope of the technical idea of the invention.

This application claims priority based on Japanese Patent Application No. 2013-038236 filed on Feb. 28, 2013, the entire disclosure of which is herein incorporated.

REFERENCE SIGNS LIST

1 Regional pixel value extraction unit
2 Spatial average value calculation unit
3 Correction unit
4 Re-correction unit
5 Output image control unit
6 Edge information calculation unit
7 Correcting function determination unit

What is claimed is:

1. An image processing method, comprising:
    deriving a pixel statistical value of pixels and edge information for each of regions in a plurality of layers, the regions including attention pixels and having ranges that are successively narrower;
    correcting differential information between a pixel statistical value for a first region and a pixel statistical value for a second region by using edge information of the second region, wherein the first region is in an attention layer and the second region is in one of the plurality of layers and is wider than the first region;
    correcting the pixel statistical value for the first region by using the corrected differential information and the pixel statistical value for the second region;
    re-correcting the corrected pixel statistical value for the first region by using a pixel statistical value for a third region and differential information between the uncorrected pixel statistical value for the first region and the corrected pixel statistical value for the first region, wherein the third region is a region equal to or wider than the first region and second region; and
    correcting the attention pixel by repeating the correcting of the pixel statistical value and the re-correcting of the corrected pixel statistical value for the first region sequentially in the respective layers until the first region is reduced from a maximum range to a minimum range.

2. The image processing method according to claim 1, wherein the re-correcting includes
    setting a smaller amount of correction and performing correcting
    when the attention pixel is included in a high-brightness region,
    setting a larger amount of correction and performing correcting when the attention pixel is included in a low-brightness region, and
    performing correcting with an amount of correction depending on a pixel statistical value for a region equal to or wider than a region in each of the layers when the attention pixel is included in a region that is neither a high-brightness region nor a low-brightness region.

3. The image processing method according to claim 1, comprising:
    calculating the differential information by using the pixel statistical value for the first region, a pixel statistical value for the second region, and the edge information for the second region.

4. The image processing method according to claim 3, wherein the pixel statistical value for the attention layer is not corrected when the edge information for the second region exceeds a preset threshold value.

5. The image processing method according to claim 1, further comprising:
    varying a degree of correction on a layer-by-layer basis when correcting the pixel statistical value for the first region by using the corrected differential information and the pixel statistical value for the second region.

6. The image processing method according to claim 5, comprising:
    varying a degree of correction depending on an amount of change in a pixel value caused by noise in the first region when correcting the pixel statistical value for the first region by using the corrected differential information and the pixel statistical value for the second region.

7. The image processing method according to claim 5, comprising:
    varying a degree of correction depending on an edge amount in the second region when correcting the pixel statistical value for the first region by using the corrected differential information and the pixel statistical value for the second region.

8. The image processing method according to claim 1, comprising:
    when correcting the pixel statistical value for the first region by using the corrected differential information and the pixel statistical value for the second region, outputting a value closer to zero for the differential information being closer to zero, and performing correcting with a smaller degree of correction for the differential information being greater.

9. An image processing device, comprising:
    a pixel statistical value calculation unit which, for each of regions in a plurality of layers, calculates a pixel statistical value of pixels for the region, the regions containing attention pixels and having ranges that are successively narrower;
    an edge information calculation unit which calculates edge information for each of the regions in the plurality of layers, the regions containing the attention pixels and having the ranges that are successively narrower;
    a correction unit which corrects differential information between a pixel statistical value for a first region and a pixel statistical value for a second region by using the edge information of the second region, wherein the first region is in an attention layer and the second region is in a layer wider than the first region, and corrects the pixel statistical value for the first region by using the corrected differential information and the pixel statistical value for the second region; and a re-correction unit which re-corrects differential information between the uncorrected pixel statistical value for the first region and the corrected pixel statistical value for the first region by using a pixel statistical value for a third region and the differential information between the uncorrected pixel statistical value for the first region and the corrected pixel statistical value for the first region, wherein the third region is equal to or wider than the first region and the second region, wherein correction of the pixel statistical value and re-correction of the corrected pixel statistical value for the first region are repeated sequentially in the respective layers until the first region is reduced from a maximum range to a minimum range.

10. The image processing device according to claim 9, wherein the re-correction unit sets a smaller amount of correction and performs correcting when the attention pixel is included in a high-brightness region, sets a larger amount of correction and performs correcting when the attention pixel is included in a low-brightness region, and performs correcting with an amount of correction depending on a pixel statistical value for a region equal to or wider than a region in each of the layer when the attention pixel is included in a region that is neither the high-brightness region nor the low-brightness region.

11. An image processing device, comprising:

pixel statistical value calculation means for, for each of regions in a plurality of layers, calculating a pixel statistical value of pixels in the region, the regions containing attention pixels and having ranges that are successively narrower;

edge information calculation means for calculating edge information for each of the regions in the plurality of layers, the regions containing the attention pixels and having the ranges that are successively narrower;

correction means for correcting differential information between a pixel statistical value for a first region and a pixel statistical value for a second region by using the edge information of the second region, and correcting the pixel statistical value for the first region by using the corrected differential information and the pixel statistical value for the second region, wherein the first region is in an attention layer and the second region is in a layer wider than the first region; and re-correction means for re-correcting differential information between the uncorrected pixel statistical value for the first region and the corrected pixel statistical value for the first region by using a pixel statistical value for a third region and the differential information between the uncorrected pixel statistical value for the first region and the corrected pixel statistical value for the first region, wherein the third region is equal to or wider than the first region and the second region, wherein correction of the pixel statistical value and re-correction of the corrected pixel statistical value for the first region are repeated sequentially in the respective layers until the first region is reduced from a maximum range to a minimum range.

* * * * *